(12) United States Patent
Andersson et al.

(10) Patent No.: US 6,693,894 B1
(45) Date of Patent: Feb. 17, 2004

(54) COMMUNICATIONS NETWORK AND METHOD FOR DIRECTLY ROUTING CALLS TO MOBILE SUBSCRIBERS USING AN INTERNET PROTOCOL NETWORK

(75) Inventors: Dick Sven Andersson, Kista (SE); Torgny Karlsson, Bromma (SE)

(73) Assignee: Telefonaktiebolaget LM Ericsson (pulb), Stockholm (SE)

( * ) Notice: Subject to any disclaimer, the term of this patent is extended or adjusted under 35 U.S.C. 154(b) by 0 days.

(21) Appl. No.: 09/228,878

(22) Filed: Jan. 12, 1999

(51) Int. Cl.[7] .............................................. G06F 12/14
(52) U.S. Cl. ...................................... 370/352; 455/432
(58) Field of Search ................................ 370/352, 356, 370/338, 328, 351; 709/245, 202, 239; 455/432

(56) References Cited

U.S. PATENT DOCUMENTS

| | | | |
|---|---|---|---|
| 5,159,592 A | 10/1992 | Perkins ....................... 370/85.7 |
| 5,751,706 A | 5/1998 | Land et al. .................. 370/352 |
| 5,793,762 A | 8/1998 | Penners et al. ............. 370/389 |
| 5,970,059 A | * 10/1999 | Ahopelto et al. ........... 370/338 |
| 6,195,705 B1 | * 2/2001 | Leung ......................... 709/245 |
| 6,229,804 B1 | * 5/2001 | Mortsolf et al. ............ 370/352 |
| 6,308,267 B1 | * 10/2001 | Gremmelmaier ............ 713/168 |
| 6,314,284 B1 | * 11/2001 | Patel et al. .................. 455/417 |

FOREIGN PATENT DOCUMENTS

| | | |
|---|---|---|
| EP | 0 766 490 | 4/1997 |
| GB | 2 321 158 | 7/1998 |
| WO | WO 98 57508 | 12/1998 |

OTHER PUBLICATIONS

Dell'Abate et al, "Performance Evaluation in Wireless Environment," IEEE 1998 p 1810–1816.*

* cited by examiner

Primary Examiner—Kenneth Vanderpuye

(57) ABSTRACT

A method and communications network is provided that directly routes a call from a calling party to a called mobile party using an IP network. More specifically, the method includes the step of determining at the IP network as to whether the called mobile party is currently roaming outside a home mobile network. In response to an affirmative determination, an address of a destination mobile network currently occupied by the called mobile party is obtained at the IP network, and the call between the calling party and the called mobile party is connected using the IP network and the destination mobile network while bypassing the home mobile network. In response to a negative determination, an address of the home mobile network is obtained at the IP network, and the call between the calling party and the called mobile party is connected using the IP network and the home mobile network.

14 Claims, 7 Drawing Sheets

COMMUNICATIONS NETWORK AND METHOD FOR DIRECTLY ROUTING CALLS TO MOBILE SUBSCRIBERS USING AN INTERNET PROTOCOL NETWORK

BACKGROUND OF THE INVENTION

1. Technical Field of the Invention

The present invention generally relates to the telecommunications field and, in particular, to a communications network and method for directly routing calls to called mobile parties using an Internet Protocol (IP) network.

2. Description of Related Art

It is well known that using an IP network for routing a long distance call can be offered at a low price by an operator as a supplementary service commonly referred to as Voice over IP or VoIP service. The operator is able to provide the VoIP service at a low price, because there is no requirement to pay accounting fees to other operators for utilizing their networks to connect the long distance call. Currently, the VoIP service is offered mostly by operators of Public Switched Telephone (PSTN) Networks, however, there is a growing interest among operators of Public Land Mobile (PLMN) networks to provide such services to mobile subscribers.

Referring to FIG. 1, there is a flowchart illustrating the conventional steps used to complete a long distant call to a called mobile subscriber using an IP network. Beginning at step 100, a calling party using the VoIP service initiates a call directed towards a called mobile party. The calling party can be a fixed subscriber using the PSTN network or a mobile subscriber using the PLMN network.

At step 102, the IP network is used to obtain an address associated with a home mobile network of the called mobile as party. At step 104, the IP network routes the call to the home mobile network at which the called mobile party subscribes to receive telecommunications service. At step 106, a determination is made at the home mobile network as to whether the called mobile party is currently located within the home mobile network or is currently roaming within another mobile network known as a destination mobile network. If the called mobile party is located within the home mobile network, then at step 108 the call is connected between the calling party and the called mobile party using the IP network and the home mobile network.

In the event the called mobile party is currently roaming within the destination mobile network, then at step 110 the home mobile network is used to obtain routing information indicating the current location of the called mobile party. At step 112, the call is then connected between the calling party and the called mobile party by routing the call from the home mobile network through the IP network to the destination mobile network.

Unfortunately, to connect the call between the called party and the roaming called mobile party requires that the call be routed from the IP network to the home mobile network and then routed from the home mobile network to the destination mobile network through the IP network. Consequently, the long distance of such a route is problematic in that extra signaling is required between the three networks and a delay in connecting the call may be increased to an unsatisfactory level due to the involvement of the home mobile network in routing the call.

Accordingly, there is a need for a method and communications network that enables a determination at an IP network as to whether a called mobile party is currently roaming and, if so, then routes the call directly to a destination mobile network occupied by the called mobile party while bypassing a home mobile network. This and other needs are satisfied by the communications network and method of the present invention.

BRIEF DESCRIPTION OF THE INVENTION

The present invention is a method and communications network that directly routes a call from a calling party to a called mobile party using an IP network. More specifically, the method includes the step of determining at the IP network whether the called mobile party is currently roaming outside a home mobile network. In response to an affirmative determination, an address of a destination mobile network currently occupied by the called mobile party is obtained at the IP network, and the call between the calling party and the called mobile party is connected using the IP network and the destination mobile network while bypassing the home mobile network. In response to a negative determination, an address of the home mobile network is obtained at the IP network, and the call between the calling party and the called mobile party is connected using the IP network and the home mobile network.

In accordance with the present invention, there is provided a method and communications network that enables the IP network to function as an IP backbone for directly routing international and long distance calls to called mobile parties.

Also in accordance with the present invention, there is provided a method and communications network that updates the IP network with current routing information indicating the current location of a called mobile party that is roaming outside of their home mobile network.

BRIEF DESCRIPTION OF THE DRAWINGS

A more complete understanding of the method and apparatus of the present invention may be had by reference In to the following detailed description when taken in conjunction with the accompanying drawings wherein.

DETAILED DESCRIPTION OF THE DRAWINGS

Figure 1:
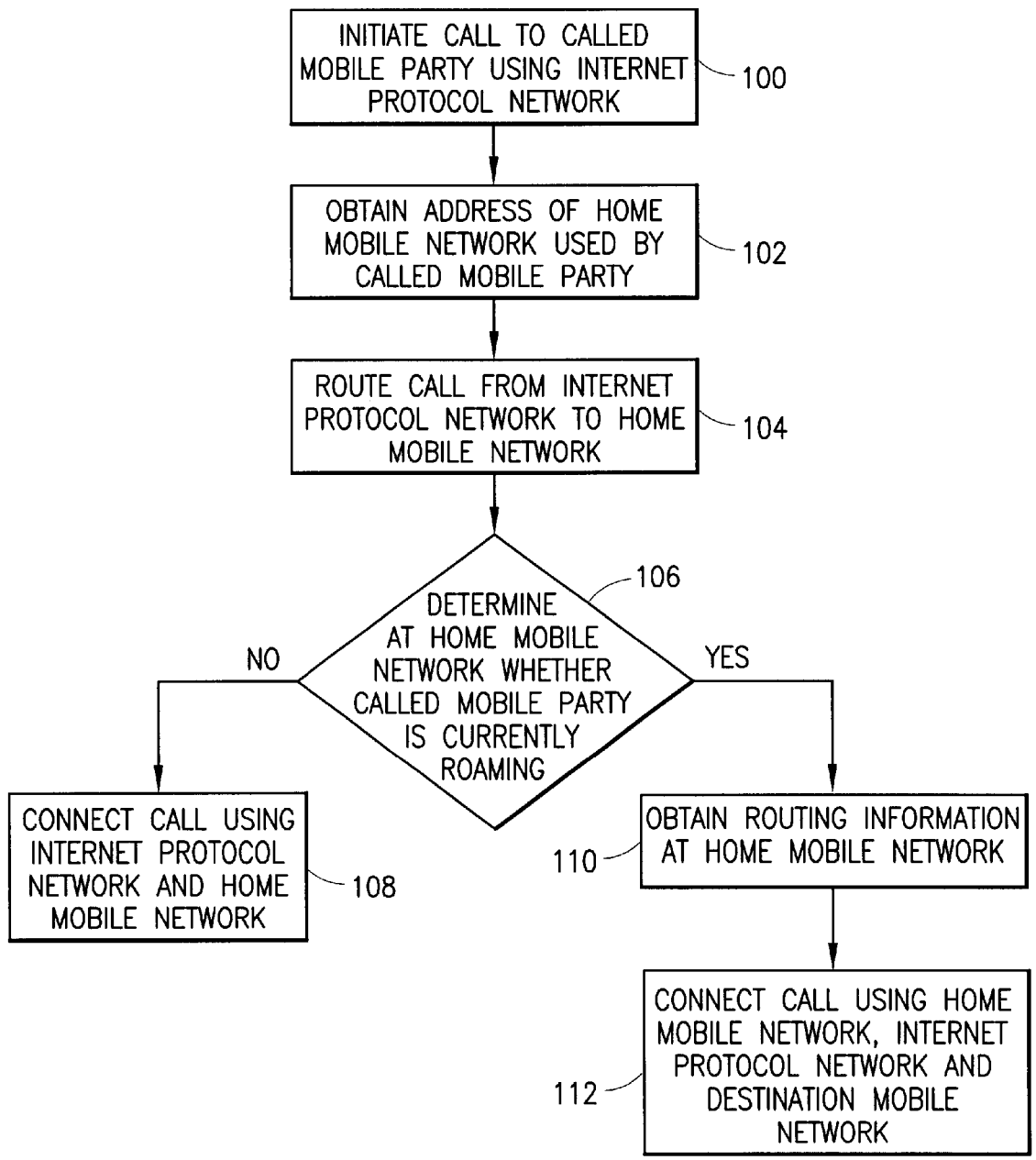
FIG. 1 (PRIOR ART) is a flowchart illustrating the conventional method used to complete a call to a called mobile party using an IP network.

Referring to the Drawings, wherein like numerals represent like parts throughout FIGS. 2–7, there are disclosed a preferred method 200 and exemplary communications network 300 in accordance with the present invention.

Figure 2:
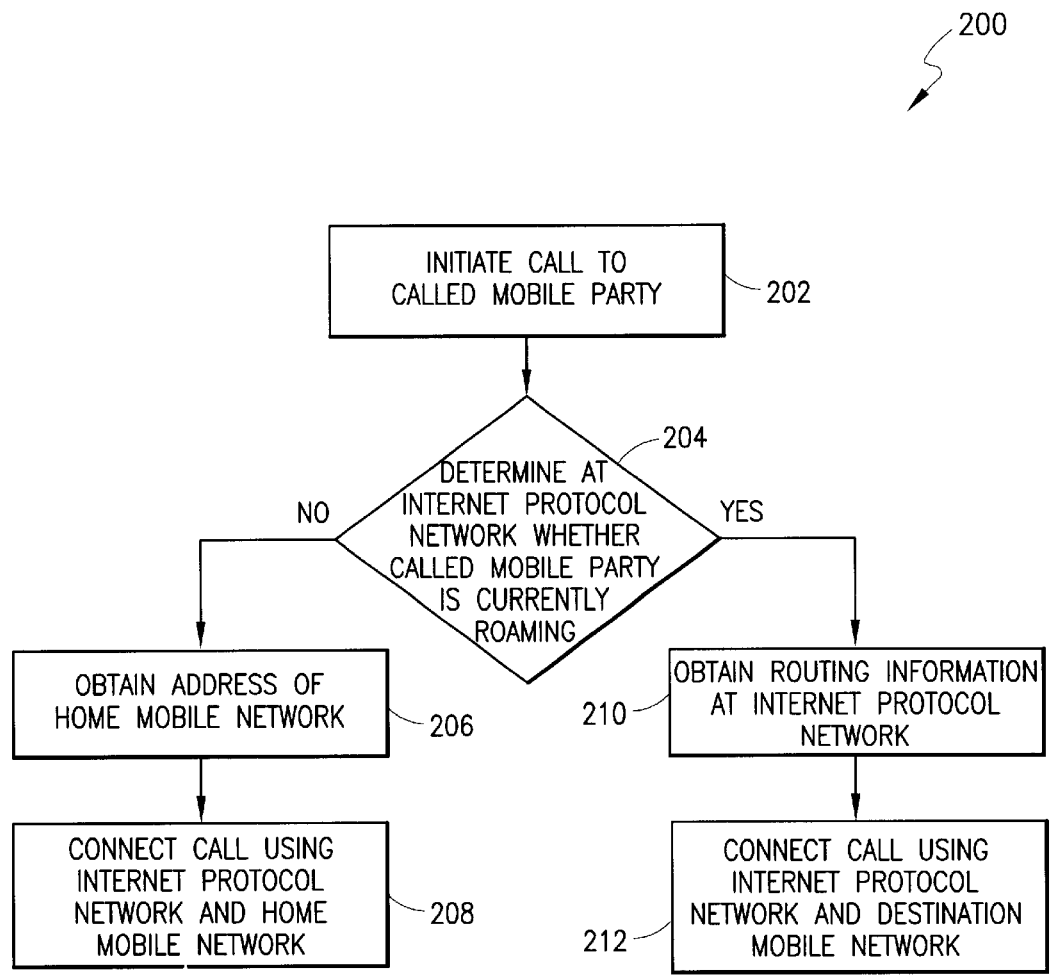
FIG. 2 is a flowchart illustrating the basic steps of a preferred method for directly routing the call to the called mobile party using the IP network in accordance with the present invention.
Figure 3:
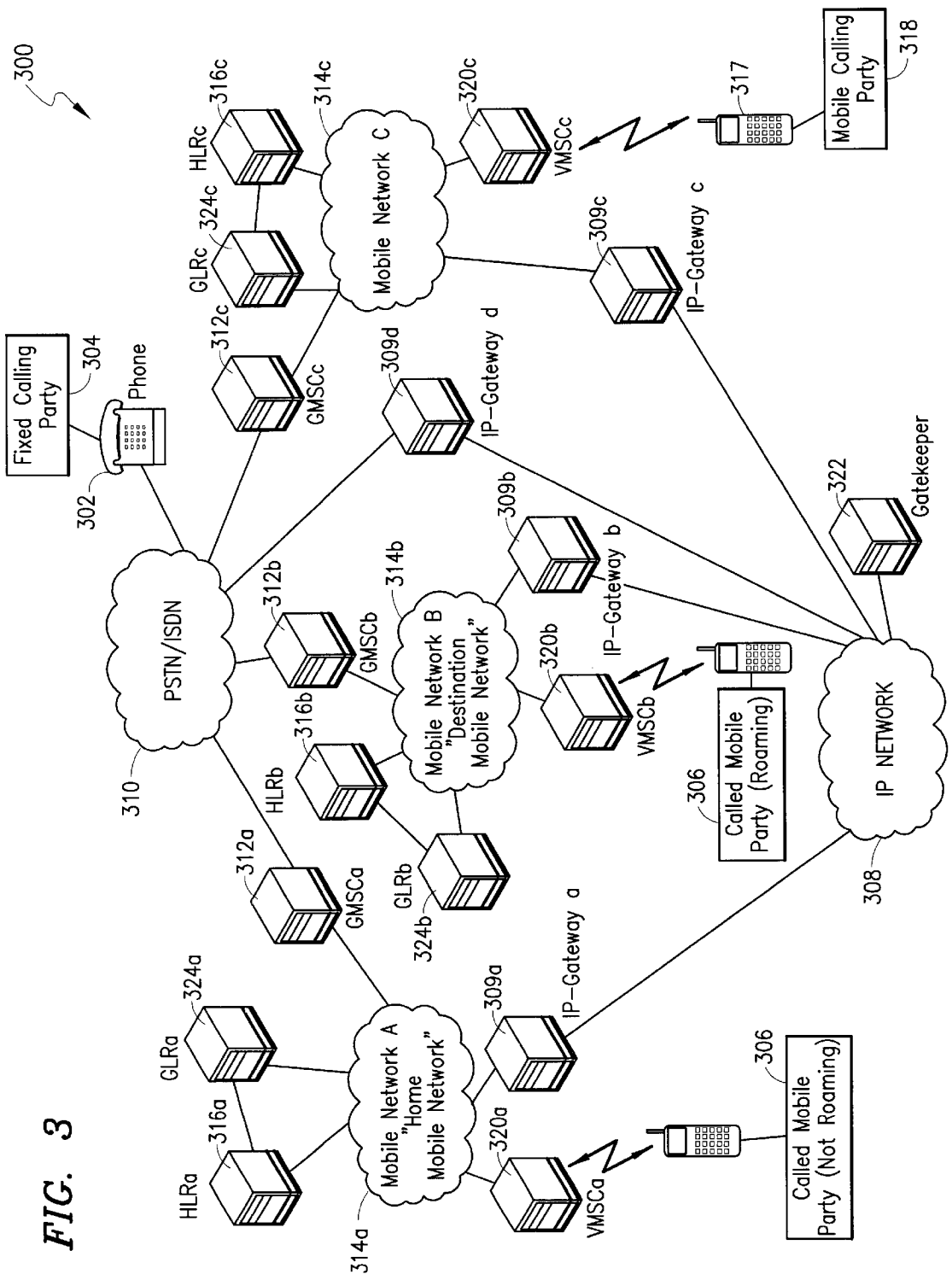
FIG. 3 is a diagram of an exemplary communications network used to directly route the call to the called mobile party through the IP network in accordance with the steps of FIG. 2.

Referring to FIGS. 2 and 3, there are a flowchart illustrating the basic steps of method 200 and a diagram of the communications network 300 used to directly route a call through an IP network 308 to a called mobile party 306 (shown as "roaming" and "not roaming"). Beginning at step 202, a calling party 304 or 318 using the VoIP service initiates the call (e.g., long distance or international call) to be directed through the IP network 308 towards the called mobile party 306. The calling party can be a fixed calling party a 304 using a PSTN network 310 or a mobile calling party 318 using a PLMN network 314c as shown in FIG. 3.

At step 204, a determination is made at the IP network 308 as to whether the called mobile party 306 is currently located within a home mobile network 314a or is currently roaming within another mobile network known as a destination mobile network 314b. The home mobile network 314a is where the called mobile party 306 subscribes to receive telecommunications service. If the called mobile party 306 ("not roaming") is located within the home mobile network 314a, then at step 206 an address of the home mobile network is obtained at the IP network 308 and, more specifically, at a gatekeeper 322 (described below). At step 208, the call is connected between the calling party 304 or 318 and the called mobile party 306 ("not roaming") by directly routing the call from the IP network 308 to the home mobile network 314a.

At step 210 and in the event the called mobile party 306 ("roaming") is currently located within the destination mobile network 314b, the gatekeeper 322 of the IP network 308 is used to obtain routing information indicating the current location of the roaming called mobile party. To be able to obtain the routing information of the "particular" called mobile party 306 requires that the routing information of all "potential" called mobile parties currently roaming be sent to the gatekeeper 322 during a location registration procedure (FIG. 4) generally conducted prior to the initiation of the call by the calling party 304 or 318. In other words, by updating the gatekeeper 322 with the routing information of all the "potential" roaming called mobile parties effectively avoids the undesirable step of obtaining the routing information from the home mobile network 314a as required in the traditional communications network (see step 108 of FIG. 1).

Lastly at step 212, the call is connected between the calling party 304 or 318 and the called mobile party 306 ("roaming") by directly routing the call from the IP network 308 to the destination mobile network 314b while bypassing the home mobile network 314a. It should be understood that bypassing the home mobile network 314a in connecting the call between the calling party 304 or 318 and the called mobile party 306 ("roaming") effectively reduces the extra signaling and delay associated with routing calls through the home mobile network as in the traditional communications network.

Referring specifically to FIG. 3, there is illustrated a diagram of one of the many possible configurations that may form the communications network 300 of the present invention. For clarity, a detailed description describing the signalling between the various components within the communications network 300 is deferred pending a discussion about the overall architecture of the communications network.

The communications network 300 can include a fixed terminal 302 used by the fixed calling party 304 and/or a mobile terminal 317 used by the mobile calling party 318 to initiate the call that is routed towards the called mobile party 306 (shown as "roaming" and "not roaming") through the IP network 308 using the VoIP service. As mentioned earlier, the VoIP service enables the calling party 304 or 318 to communicate at a low cost with the called mobile party 306, because, an operator using the IP network 308 is not required to pay accounting fees to other operators for utilizing their networks in connecting the call.

The fixed terminal 302 (e.g., land based terminal, PSTN/ISDN telephone) is connected to the PSTN/ISDN network 310 which, in turn, connects to a plurality of gateway mobile services switching centers (GMSC) 312a, 312b or 312c. Each GMSC 312a, 312b and 312c functions as an interface that connects the PSTN/ISDN network 310 to a corresponding PLMN network 314a, 314b and 314c. Likewise, the PLMN networks 314a, 314b, and 314c are connected to the IP network 308 by way of IP gateways 309a, 309b and 309c, respectively. In addition, the PSTN/ISDN network 310 is connected to the IP network 308 using an IP gateway 309d which enables a call from the fixed side to a mobile station by way of the IP network.

Each of the PLMN networks 314a, 314b and 314c are connected to a corresponding home location register (HLR) 316a, 316b and 316c and gateway location register (GLR) 324a, 324b and 324c. The HLRs 316a, 316b and 316c each operate to maintain subscription data and keep track of the current location of mobile subscribers such as the called mobile party 306 and the mobile calling party 318 that subscribe to their particular PLMN network. Whereas, each GLR 324a, 324b and 324c operates to maintain subscription data of the mobile subscribers associated with other networks that are visiting the respective PLMN network 314a, 314b and 314c. For purposes of clarity in the present discussion, the called mobile party 306 subscribes to PLMN network 314a referred to as the home mobile network, and when roaming the called mobile party 306 is located within the PLMN network 314b referred to as the destination mobile network.

Each HLR 316a, 316b and 316c is able to keep track of the current location of its respective mobile subscribers and, more specifically, the mobile terminals used by the mobile subscribers; because, as one of the mobile terminals travels into a geographic area serviced by another PLMN network 314a, 314b or 314c it initiates the location registration procedure with a corresponding visited mobile switching center (VMSC) 320a, 320b or 320c. More particularly, the VMSC 320a, 320b or 32c informs via the corresponding GLR 324a, 324b or 324c the particular HLR 316a, 316b, or 316c associated with the home mobile network of the roaming mobile subscriber which then informs the gatekeeper 322 with routing information indicating the current location of the mobile terminals. In this way, the routing information of the "potential" roaming called mobile party 306 is stored by the gatekeeper 322 prior to the initiation of the call by the calling party 304 or 318.

For example, as the called mobile party 306 travels into the geographic area serviced by PLMN network 314b ("destination mobile network") it registers with VMSC 320b and GLR 324b which, in turn, informs HLR 316a and the gatekeeper 322 (only one shown) as to the current location of the called mobile party. As mentioned above, the routing information indicating the current location of the called mobile party 306 is transmitted to the gatekeeper 322 prior to initiating the call by either the fixed calling party 304 or the mobile calling party 318.

It should also be understood that the communications network 300 was described with reference to the Personal Digital Cellular (PDC) and PSTN standards, and those skilled in the art will appreciate that other standards such as the Global System for Mobile Communications (GSM) standard may also utilize the principles of the present invention. Accordingly, the communications network 300 described should not be construed in such a limited manner.

Figure 4:
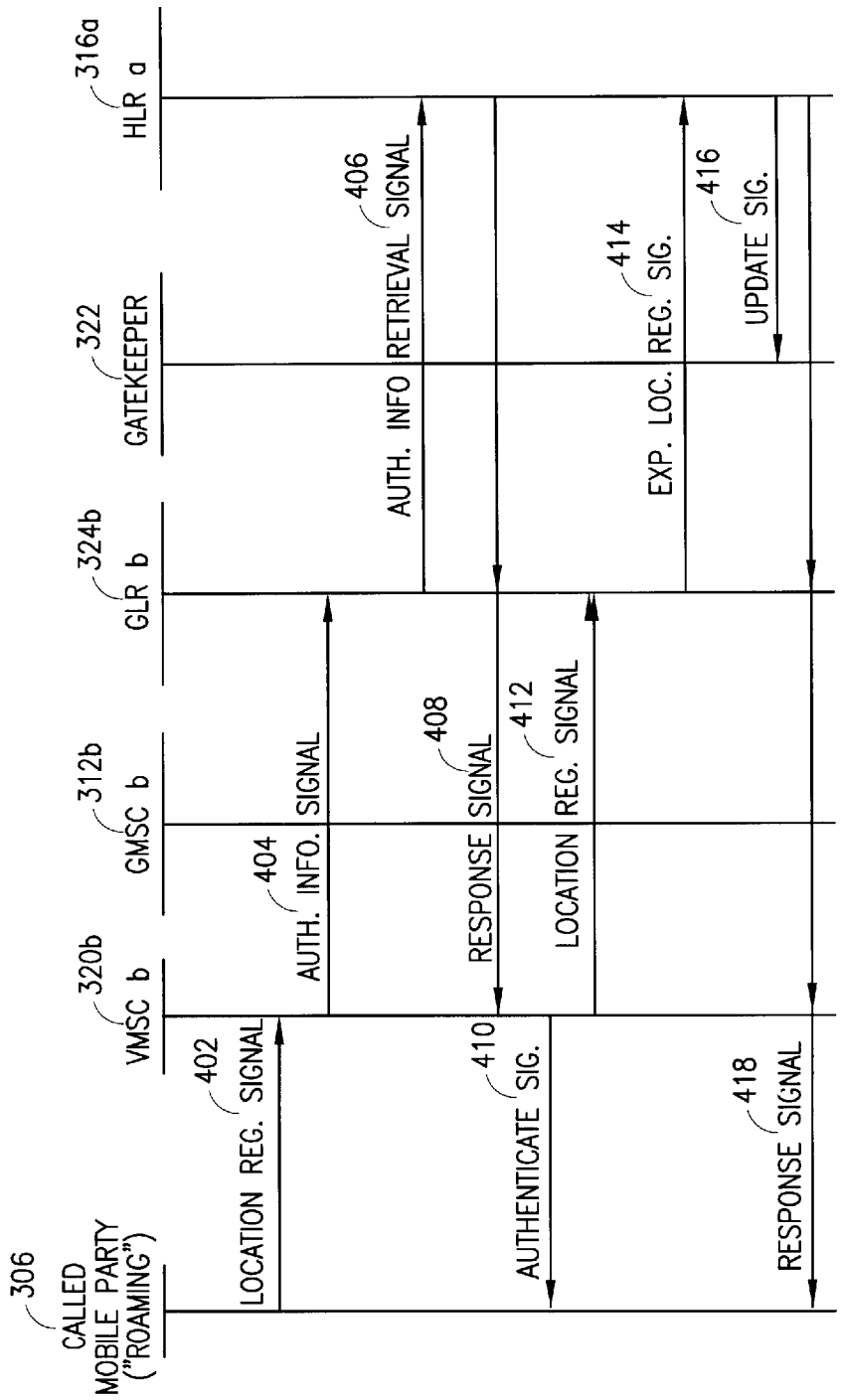
FIG. 4 is a signal sequence chart illustrating a location registration procedure initiated when the called mobile party has not been called by a calling party and is roaming within a destination mobile network of the communications network shown in FIG. 3.

Referring to FIG. 4, there is a signal sequence chart illustrating the location registration procedure used when the called mobile party 306 roams into the geographic area serviced by the destination mobile network 314b in accordance with the present invention. Again, neither of the calling parties 304 and 318 have at this time initiated the call towards the called mobile party 306.

As illustrated, the called mobile party 306 ("roaming") issues a location registration signal 402 to VMSC 320b after the mobile terminal used by the called mobile party detects that it has moved into the geographic area serviced by the destination mobile network 314b. The VMSC 320b determines us that the called mobile party 306 is a visitor and starts an authentication procedure, which includes transmitting an authentication information signal 404 to the GLR 324b. The authentication information signal 404 includes a mobile subscriber number (MSN) and international mobile subscriber identity (IMSI) associated with the mobile terminal used by the called mobile party 306.

In response to receiving the authentication information signal 404, GLR 324b transmits an authentication information retrieval signal 406 containing the MSN and IMSI to HLR 316a associated with the home mobile network 314a. The HLR 316a responds by transmitting a response signal 408 containing authentication keys back to the VMSC 320b through the GLR 324b. The VMSC 320b then transmits an authenticate signal 410 to the called mobile party 306 to complete the authentication procedure.

The VMSC 320b then commences the location registration procedure by transmitting a location registration signal 412 containing the MSN and IMSI to GLR 324b. The GLR 324b assigns a roaming number (RON) or new B-number indicating the current routing information to the called mobile party 306, and transmits an expanded location registration signal 414 to HLR 316a. The expanded location registration signal 414 contains the MSN, IMSI and RON all of which are associated with the called mobile party 306. The communications between the VMSC/GLR and GLR/HLR are generally done in accordance with a protocol known as mobile application part (MAP).

In response to receiving the expanded location registration signal 414, the HLR 316a transmits an update signal 416 containing the MSN and RON to the gatekeeper 322. The HLR 316a also transmits a response signal 418 containing service data and various keys to the called mobile party 306 through GLR 324b and VMSC 320b. Again, all the visiting mobile terminals that roam into the geographic area covered by PLMN 314b would follow a similar location registration procedure so as to be ready to receive a call in accordance with the present invention.

Figure 5:
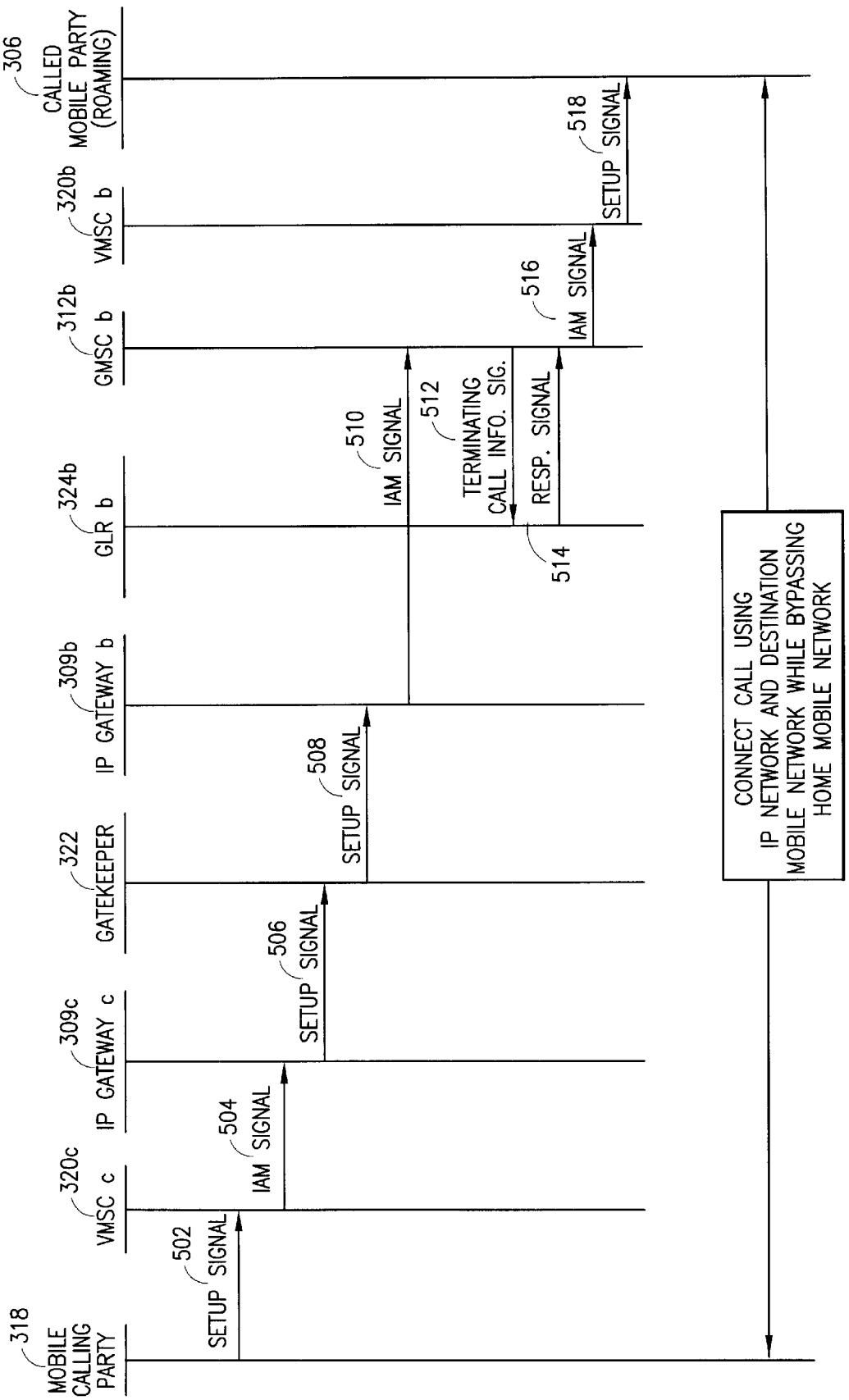
FIG. 5 is a signal sequence chart illustrating the steps for directly routing the call to the called mobile party located within the destination mobile network of the communications network.
Figure 7:
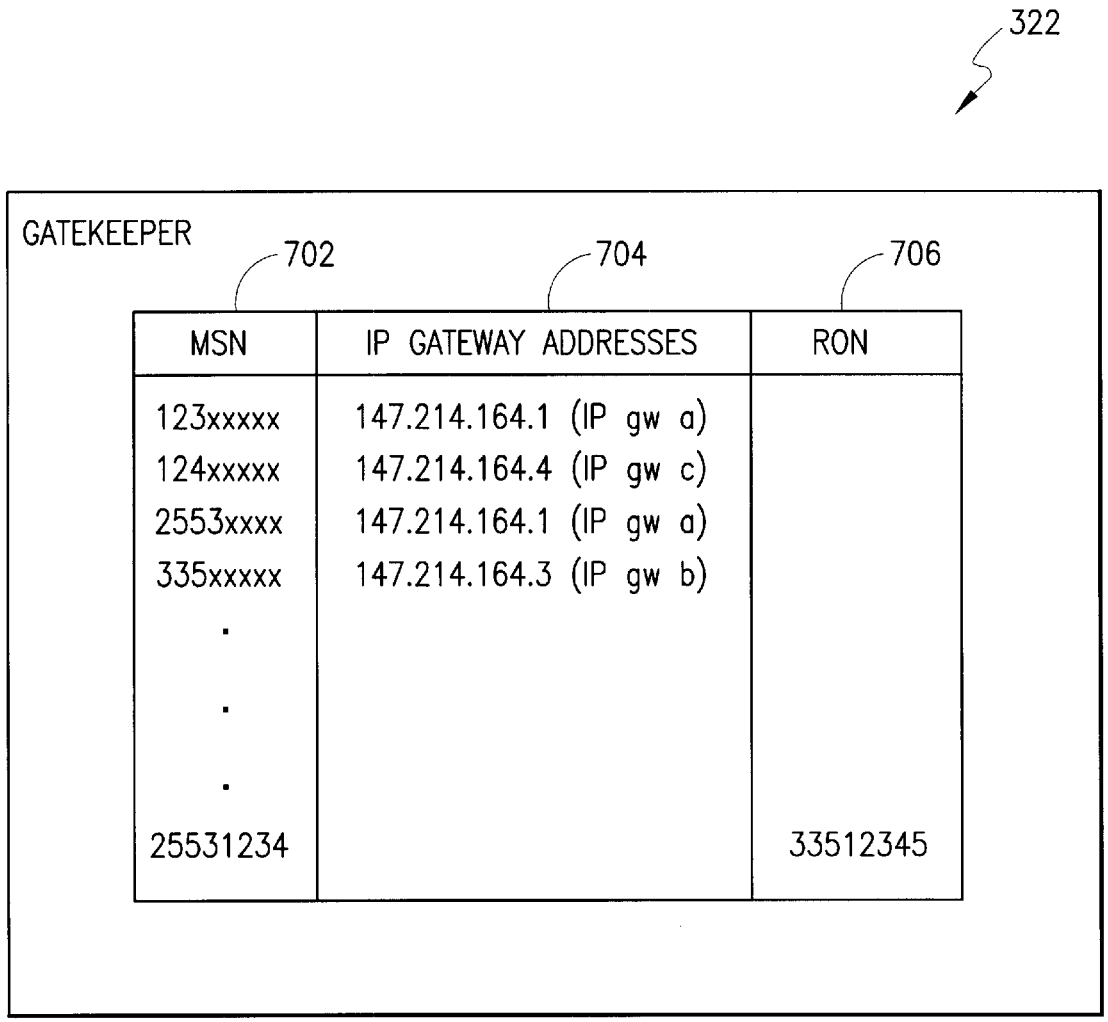
FIG. 7 is a block diagram illustrating a gatekeeper of the IP network that is updated during the location registration procedure of FIG. 4 with routing information indicating the current location of the called mobile party.

Referring to FIGS. 5 and 7, there are illustrated a signal sequence chart and gatekeeper 322 used to describe the steps required to directly route the call to the called mobile party 306 ("roaming") located in the destination mobile network 314b. The calling mobile party 318 (for example) initiates the call to the called mobile party 306 located within the destination mobile network 314b by transmitting a setup signal 502 to VMSC 320c. The setup signal 502 contains the B-number (e.g., MSN "25531234" of FIG. 7) assigned to the called mobile party 306.

The VMSC 320c analyzes the B number and sets up the call by transmitting an IAM signal 504 to IP gateway 309c using, for example, ISDN user part signaling (ISUP signaling). The IAM signal 504 contains the B number (e.g., MSN "25531234") of the called mobile party 306. The IP gateway 309c then transmits a setup signal 506 containing the B number (e.g., MSN "25531234") to the gatekeeper 322 utilizing Q.931 signaling (for example).

In response to receiving the setup signal 506, gatekeeper 322 maps the received MSN (e.g., MSN "25531234") to a corresponding RON (e.g., RON "33512345" of FIG. 7) which indicates that the called mobile party 306 is roaming within a mobile network (e.g., destination mobile network 314b) other than the home mobile network 314a. An address (e.g., address "147.214.164.3" of FIG. 7) assigned to the destination mobile network 314b is obtained by mapping the RON (e.g., RON "33512345") to a list 704 of IP gateway addresses associated with all of the PLMN networks 314a, 314b and 314c. In the event that the gatekeeper 322 is not able to map the received MSN (e.g., MSN "25531234" of FIG. 7) to a corresponding RON then the called mobile party 306 is determined to be located in the home mobile network 314a (FIG. 6).

Thereafter, gatekeeper 322 transmits a setup signal 508 containing the RON to IP gateway 309b having the mapped address (e.g., address "147.214.164.3"). The IP gateway 309b transmits an IAM signal 510 containing the RON to GMSC 312b using, for example, ISUP signaling. The GMSC 312b transmits a terminating call information signal 512 containing the RON to GLR 324b. The GLR 324b maps the RON (e.g., RON "33512345") back to the MSN (e.g., MSN "25531234") and transmits a response signal 514 containing the MSN and a pursuit routing number (PRN) to GMSC 312b.

Upon receiving the response signal 514, GMSC 312b utilizes the PRN to identify the VMSC 320b associated with the called mobile party 306 ("roaming"). The GMSC 312b transmits an IAM signal 516 containing the B number and MSN (e.g., MSN "25531234") to VMSC 320b which transmits a setup signal 518 to the called mobile party 306. Thereafter, the call is connected between the roaming called mobile party 306 and the calling mobile party 318 using the IP network 308 and the destination mobile network 314b while bypassing the home mobile network 314a.

Figure 6:
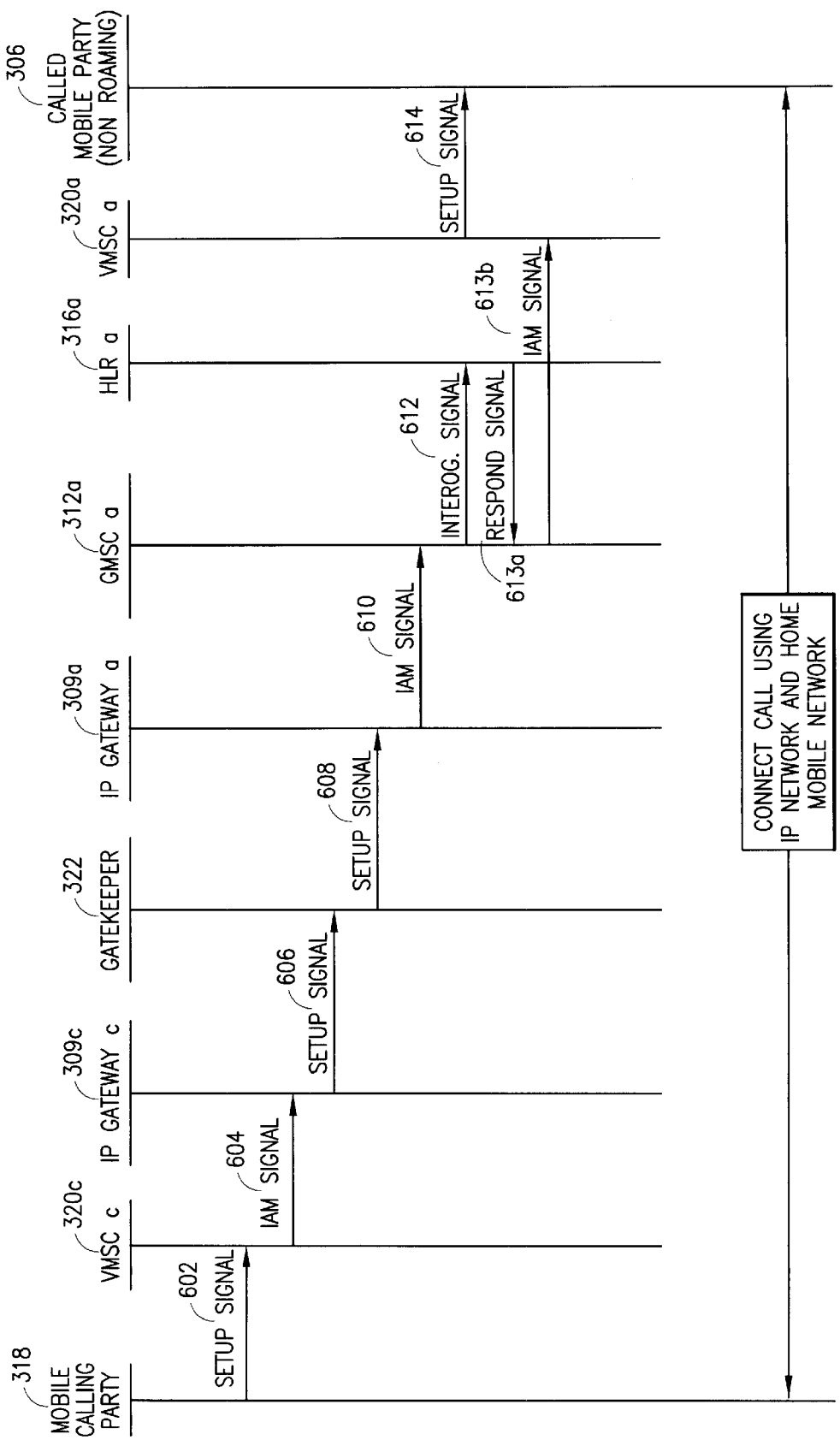
FIG. 6 is a signal sequence chart illustrating the steps used for directly routing the call to the called mobile party located in a home mobile network of the communications network.

Referring to FIGS. 6 and 7, there are illustrated a signal sequence chart and gatekeeper 322 used to describe the steps required to directly route the call to the non-roaming called mobile party 306 ("non-roaming") located in the home mobile network 314a. The calling mobile party 318 (for example) initiates the call to the called mobile party 306 located within the home mobile network 314a by transmitting a setup signal 602 to VMSC 320c. The setup signal 602 contains the B-number and MSN (e.g., MSN "12346328" of FIG. 7) assigned to the called mobile party 306.

The VMSC 320c analyzes the B number and sets up the call by transmitting an IAM signal 604 to IP gateway 309c using ISUP signaling (for example). The IAM signal 604 contains the B number (e.g., MSN "12346328") of the called mobile party 306. The IP gateway 309c then transmits a setup signal 606 containing the B number (e.g., MSN "12346328") to the gatekeeper 322 utilizing Q.931 signaling (for example).

In response to receiving the setup signal 606, gatekeeper 322 attempts to map the received MSN (e.g., MSN "12346328") to a corresponding RON which does not exist in this example because the called mobile party 306 is located within the home mobile network 314a. An address (e.g., address "147.214.164.1" of FIG. 7) assigned to the home mobile network 314a is obtained by mapping the MSN (e.g., MSN "12346328") to the list 704 of IP gateway addresses. It is important to know that since the called mobile party 306 is not roaming there was no location registration procedure conducted so as to map a RON with an MSN as described in FIG. 5.

Thereafter, gatekeeper 322 transmits a setup signal 608 containing the MSN to IP gateway 309a having the mapped address (e.g., address "147.214.164.1"). The IP gateway 309a transmits an IAM signal 610 containing the MSN to GMSC 312a using, for example, ISUP signaling. The GMSC 312a transmits an interrogation signal 612 containing the MSN to HLR 316a which transmits a response signal 613a containing the MSN and a pursuit routing number (PRN) to GMSCa 312a. Upon receiving the response signal 613a, GMSCa 312a utilizes the PRN to identify VMSCa 320a associated with the called mobile party 306 ("not roaming"). The GMSCA 312a transmits an IAM signal 613b containing the B number and MSN (e.g., MSN "12346328") to VMSCa 320a which transmits a setup signal 614 to the called mobile party 306. Thereafter, the call is connected between the non-roaming called mobile party 306 and the calling mobile party 318 using the IP network 308 and the home mobile network 314a.

Referring now to FIG. 7, there is a block diagram illustrating the gatekeeper 322 that has been enhanced to store routing information (e.g., RON) indicating the current location of the called mobile party 306. The gatekeeper 322 generally operates to handle functions including address mapping, admission control and bandwidth management when handling calls (e.g., H.323 IP voice calls) received from the calling parties 304 and 318 through the IP gateways 309a, 309b, 309c and 309d.

The gatekeeper 322 includes an MSN list 702 containing several series of MSN numbers (e.g., MSNs "2553xxxx" and "123xxxxx") that are assigned to various operators within the communications network 300. The MSN list 702 is mapped to the IP gateway list 704 which contains at least one address assigned to each of the PLMN networks 314a, 314b and 314c. The gatekeeper 322 also includes a RON list 706 that contains the RON or new B number of the called mobile party 306 ("roaming") received during the location registration procedure. The RON list 706 is mapped to the MSN list 702 and enables the call to be directly routed to the called mobile party 302 ("roaming") without requiring the home mobile network 314a to be in the loop as in the traditional communications network.

It should be understood that the communications network 300 can include multiple gatekeepers 322 (only one shown) such that each PLMN network could have a dedicated gatekeeper. In such a configuration, the routing information (e.g., RONs) transmitted from a HLR would go directly to the gatekeeper dedicated to the same PLMN network associated with the HLR.

From the foregoing, it can be readily appreciated by those skilled in the art that the present invention provides a method and communications network that enables an Internet network to function as an IP backbone for directly routing international and long distance calls to called mobile parties.

Although one embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for directly routing a call from a calling party to a called mobile party, said method comprising:
   determining whether the called mobile party is currently roaming and determining whether a mobile subscriber number of the called mobile party has an updated corresponding roaming number stored within an Internet Protocol network; and
   if so,
      obtaining an address of a destination mobile network; and
      connecting the call between the calling party and the called mobile party using an Internet Protocol network and the destination mobile network while bypassing a home mobile network of the called mobile party; and
      if said called mobile party is not currently roaming, obtaining an address of the home mobile network; and
      connecting the call between the calling party and the called mobile party using the Internet Protocol network and the home mobile network.

2. The method of claim 1, wherein said step of obtaining an address of a destination mobile network further includes mapping the roaming number to the address associated with the destination mobile network.

3. The method of claim 1, wherein said step of obtaining an address of the home mobile network further includes mapping the mobile subscriber number to the address associated with the home mobile network.

4. A method for directly routing a call from a calling party to a mobile subscriber, said method comprising the steps of:
   updating an Internet Protocol network with current location information about the mobile subscriber whenever the mobile subscriber roams into a mobile network other than a home mobile network, said current location information including a roaming lumber;
   mapping a mobile subscriber number of the mobile subscriber to the roaming number;
   assigning the roaming number at the home mobile network during a location registration procedure;
   transmitting the roaming number to the Internet Protocol network prior to the calling party initiating the call to the called mobile party;
   determining, using the current location information, a destination mobile network currently occupied by the mobile subscriber; and
   connecting the call between the calling party and the mobile subscriber using the Internet Protocol network and the destination mobile network while bypassing a home mobile network of the mobile subscriber.

5. The method of claim 4, wherein said step of determining a destination mobile network further includes obtaining, within the Internet Protocol network, an address of the destination mobile network by mapping the roaming number to the address associated with the destination mobile network.

6. The method of claim 5, wherein said step of connecting further includes mapping, within the destination mobile network, the roaming number to the mobile subscriber number of the mobile subscriber, and forwarding the call to the mobile subscriber.

7. A communications network for directly routing a call from a calling party to a called mobile party, said communications network comprising:

an Internet Protocol network including a gatekeeper; a home mobile network for updating the gatekeeper with current location information about the called mobile party prior to the calling party initiating the call to the called mobile party, said current location information includes a roaming number or a new B-number; and a destination mobile network, wherein said gatekeeper, by maintaining the current location information, enables an address of the destination mobile network to be determined such that a direct route for the call can be established between the calling party and the called mobile party currently roaming within the destination mobile network by using the Internet Protocol network and the destination mobile network while bypassing the home mobile network, said gatekeeper further includes a list configured to associate the roaming number with a mobile subscriber number of the mobile subscriber so as to enable the determination of the address associated with the destination mobile network.

8. The communications network of claim 7, wherein said mobile subscriber number further includes a B-number.

9. The communications network of claim 7, wherein said home mobile network, further includes a home location register for assigning the roaming number during a location registration procedure and transmitting the roaming member to the Internet Protocol network prior to the calling party initiating the call to the called mobile party.

10. The communications network of claim 7, wherein said calling party further includes a fixed calling party or a mobile calling party.

11. A gatekeeper used within an Internet Protocol network for enabling a call to be directly routed from a calling party to a called mobile party, said gatekeeper comprising:

a list for maintaining an address of a home mobile network, an address of a destination mobile network, a mobile subscriber number and a roaming number;

means for mapping the mobile subscriber number to the roaming number when said called mobile party is roaming outside of the home mobile network; and means for mapping the roaming number to the address of the destination mobile network such that the call can be established between the calling party and the called mobile party located within the destination mobile network by using the Internet Protocol network and the destination mobile network while bypassing the home mobile network.

12. The gatekeeper of claim 11, wherein said mobile subscriber number further includes a B-number.

13. The gatekeeper of claim 11, wherein said roaming number further includes a new B-number received from the home mobile network during a location registration procedure conducted prior to the calling party initiating the call to the called mobile party.

14. The gatekeeper of claim 11, wherein said calling party further includes a fixed calling party orb mobile calling party.

* * * * *